April 1, 1924.
J. F. BURNAM
FENDER BRACE
Filed March 17, 1923
1,489,062
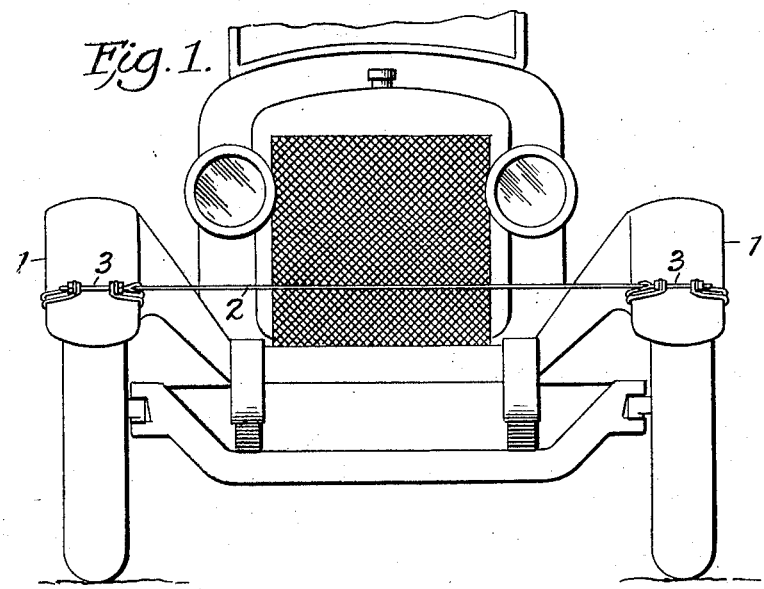
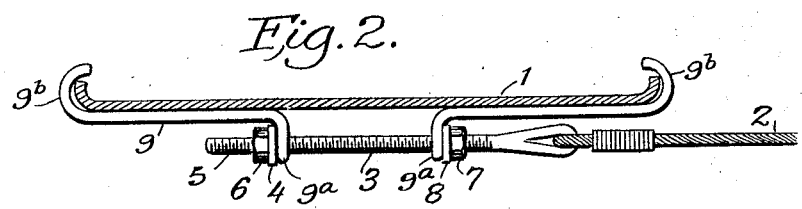
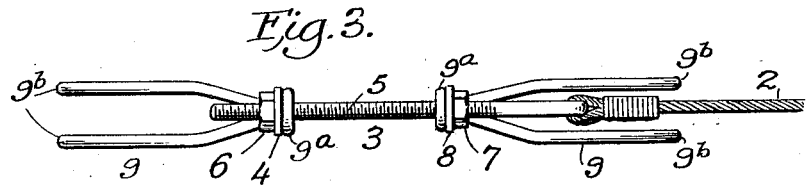
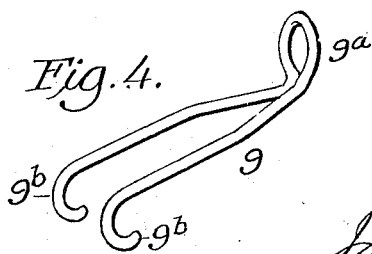
Inventor
James F. Burnam
By Edson Bros.
Attorneys Patented Apr. 1, 1924.

1,489,062

UNITED STATES PATENT OFFICE.

JAMES F. BURNAM, OF HUNTSVILLE, ALABAMA.

FENDER BRACE.

Application filed March 17, 1923. Serial No. 625,790.

*To all whom it may concern:*

Be it known that I, JAMES F. BURNAM, a citizen of the United States, residing at Huntsville, in the county of Madison and State of Alabama, have invented certain new and useful Improvements in Fender Braces, of which the following is a specification.

This invention relates to improvements in devices for holding the fenders of automobile guards under tension, and to lift guards which have become loose and thus hold them in their proper position.

The object of the invention is to provide a brace which can be applied to any type of automobile, and to fenders of different widths, or to fenders of greater or less distance apart.

The invention consists of a cable that may be connected by means of hooks, or other suitable devices, to either, or both, sides of each of the fenders; and then, by adjusting means, put the cable which carries said hooks under tension, whereby the fenders will either be raised to their normal position or be prevented from dropping away from such position.

Referring to the drawing, which illustrates my preferred forms of construction, but which, it will be understood, merely represent embodiment of my invention, subject to such changes in form and proportion of parts as may be desired in the proper application of my improvements:

Figure 1 is a conventional illustration of the front of an automobile with one form of my brace attached to the fenders thereof.

Fig. 2 shows a side elevation of my brace, greatly enlarged in order to bring out the construction as shown in Fig. 1. For purpose of convenience the brace is shown upside down.

Fig. 3 is also an enlarged plan view of my improved brace, showing the hooks applied to both edges of a fender.

Fig. 4 is a modification of my invention showing the means at each side of the fender for tightening the brace in position.

1 refers to the two front fenders, and 2 to a flexible wire cable which is connected to an eye bolt 3, which has hooks 4 adapted to engage opposite sides of the fenders. This eye bolt is provided with a thread 5 which extends from the eye to the outer end of the eye bolt. Mounted on this thread are two nuts 6 and 7 which may be turned to the right or left in order to increase or decrease the strain of the cable upon the eye bolts as one or the other of the nuts are adjusted upon the threaded portion of the eye bolt. Two washers 7 and 8 are also placed on said thread portion of the eye bolt between the nuts inside of said nuts so that the loop portion of the hooks will not be effected by the adjustment of the nuts, except to tighten, lessen or increase the strain of the cable upon the eye bolts.

Each eye bolt, there being one at each end of the cable, is preferably made with bifurcated hooks 9 which are placed over the eye bolt between the washers thereon. It will be understood that the threaded eye bolt with the nuts and washers and hooks are duplicated at the opposite end of the cable and that all the strain of the cable comes directly on the eye bolt instead of having the cable fold upon itself, as has heretofore been done.

The hooks 9 have eyes $9^a$, which extend about at right angles. Said eyes being formed by constricting their sides just below the eyes so that they will be confined upon the eye bolt. The hooks 9 are formed with preferably spring metal having hook portions $9^b$ at the distal ends and constricted at their inner portions to form the eyes which ride upon the threaded eye bolt, other means of attachment to the eye bolt not being necessary. The diverging portions $9^c$ of the hook space the hooks at the ends at desired distance apart and serves to facilitate mounting the hooks upon the eye bolt. It will be understood that this construction is substantially duplicated at the opposite end of the cable as shown.

I claim:

1. A brace for automobiles comprising two pairs of fender embracing clamps having hook portions and eye portions, a screw threaded eye bolt extending through said eye portion of each pair and a flexible cable connecting said eye bolts.

2. A brace for automobiles comprising two pairs of fender embracing clamps, each clamp having hooked ends and an intermediate looped portion, a threaded eye bolt extending loosely through the looped portion of each pair, locking and adjusting nuts on said eye bolts, and a flexible cable connecting said eye bolts.

In testimony whereof I affix my signature.

JAMES F. BURNAM.